United States Patent
Das et al.

(10) Patent No.: US 10,455,445 B2
(45) Date of Patent: Oct. 22, 2019

(54) PERFORMANCE OPTIMIZATION FOR AVIONIC WIRELESS SENSOR NETWORKS

(71) Applicant: GOODRICH AEROSPACE SERVICES PRIVATE LIMITED, Bangalore, Karnataka (IN)

(72) Inventors: Subhra Kanti Das, Bangalore (IN); Adishesha Chinknyakanhalli Sivaramasastry, Karnataka (IN)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 27 days.

(21) Appl. No.: 15/683,885

(22) Filed: Aug. 23, 2017

(65) Prior Publication Data
US 2018/0376367 A1 Dec. 27, 2018

(30) Foreign Application Priority Data
Jun. 22, 2017 (IN) .............................. 201711021856

(51) Int. Cl.
*H04W 28/02* (2009.01)
*H04L 12/70* (2013.01)
(Continued)

(52) U.S. Cl.
CPC ......... *H04W 28/0268* (2013.01); *H04L 47/00* (2013.01); *H04L 47/245* (2013.01);
(Continued)

(58) Field of Classification Search
None
See application file for complete search history.

(56) References Cited

U.S. PATENT DOCUMENTS 7,231,180 B2 6/2007 Benson et al.
7,590,058 B1 * 9/2009 Cherchali ............... H04L 47/10
370/230
(Continued)

FOREIGN PATENT DOCUMENTS

EP 0595440 6/1999
EP 1806880 A1 7/2007
(Continued)

OTHER PUBLICATIONS

EP Application No. 18179344.9 Extended European Search Report dated Oct. 15, 2018, 10 pages.

*Primary Examiner* — Gregory B Sefcheck
*Assistant Examiner* — Suk Jin Kang
(74) *Attorney, Agent, or Firm* — Cantor Colburn LLP

(57) ABSTRACT

A data aggregator includes a traffic characterization module, a rate estimator, a data regulator, and a sensor data transmission interface. The traffic characterization module is operable to generate a predicted quality of service for a plurality of sensors having one or more data rates and a plurality of priorities. The rate estimator is operable to generate a plurality of required data rates to maintain a target quality of service for one or more data consumers of an avionic communication network based on the predicted quality of service. The data regulator is operable to hold and release a plurality of sensor data from the sensors in one or more queues at the required data rates as a regulated data flow. The sensor data transmission interface is operable transmit the regulated data flow to the one or more data consumers.

14 Claims, 4 Drawing Sheets

(51) Int. Cl.
*H04L 29/08* (2006.01)
*H04Q 9/00* (2006.01)
*H04W 4/38* (2018.01)
*H04L 12/851* (2013.01)
*H04L 12/859* (2013.01)
*H04W 28/22* (2009.01)
*H04W 84/18* (2009.01)

(52) U.S. Cl.
CPC .......... *H04L 47/2475* (2013.01); *H04L 67/12* (2013.01); *H04L 67/322* (2013.01); *H04Q 9/00* (2013.01); *H04W 4/38* (2018.02); *H04W 28/22* (2013.01); *H04Q 2209/40* (2013.01); *H04W 84/18* (2013.01)

(56) References Cited

U.S. PATENT DOCUMENTS

| | | | |
|---|---|---|---|
| 8,352,392 | B2 | 1/2013 | Swift et al. |
| 8,849,475 | B1 | 9/2014 | Sudolsky et al. |
| 9,578,095 | B2 | 2/2017 | Zavesky et al. |
| 9,628,365 | B2 | 4/2017 | Gelvin et al. |
| 9,813,938 | B2* | 11/2017 | Merlin ............. H04W 28/0268 |
| 9,824,595 | B1* | 11/2017 | Pate ..................... G07C 5/0841 |
| 2003/0055938 | A1* | 3/2003 | Barzilai ................ H04L 47/562 709/223 |
| 2004/0184464 | A1* | 9/2004 | Holden ................... G06F 13/24 370/395.51 |
| 2004/0253940 | A1* | 12/2004 | Andrews ................. H04L 47/10 455/405 |
| 2005/0281278 | A1* | 12/2005 | Black ..................... H04L 1/0002 370/412 |
| 2007/0153802 | A1* | 7/2007 | Anke ..................... H04L 47/10 370/395.42 |
| 2008/0056295 | A1* | 3/2008 | Loda ...................... H04L 45/10 370/437 |
| 2009/0138420 | A1 | 5/2009 | Swift et al. |
| 2009/0290579 | A1* | 11/2009 | Cherchali ............... H04L 47/10 370/352 |
| 2010/0020681 | A1* | 1/2010 | Nakashima ......... H04L 12/4625 370/229 |
| 2010/0142445 | A1* | 6/2010 | Schlicht .................. H04W 4/20 370/328 |
| 2011/0310768 | A1 | 12/2011 | Shin |
| 2013/0003620 | A1 | 1/2013 | Dame |
| 2015/0330869 | A1* | 11/2015 | Ziarno .................. G01M 15/14 701/34.4 |
| 2015/0341594 | A1* | 11/2015 | Ma ....................... H04N 19/172 348/14.02 |
| 2015/0365841 | A1* | 12/2015 | Wilhelmsson ........ H04W 24/10 370/252 |
| 2016/0028608 | A1 | 1/2016 | Dasgupta et al. |
| 2016/0183281 | A1* | 6/2016 | Yeh ....................... H04W 28/24 370/332 |
| 2016/0196527 | A1* | 7/2016 | Bose .................. G06Q 10/0832 705/332 |
| 2016/0234128 | A1* | 8/2016 | Robertson ........... H04L 47/6295 |
| 2016/0269240 | A1* | 9/2016 | Balakrishnan ...... H04L 41/0833 |
| 2016/0381596 | A1* | 12/2016 | Hu ....................... H04B 7/0617 370/236 |
| 2017/0034277 | A1* | 2/2017 | Jackson .................. H04L 67/12 |
| 2017/0054776 | A1* | 2/2017 | Dao ....................... H04L 65/80 |
| 2017/0332282 | A1* | 11/2017 | Dao ...................... H04L 1/0002 |
| 2018/0205658 | A1* | 7/2018 | Sullivan ............... H04L 47/2441 |
| 2018/0227787 | A1* | 8/2018 | Wilhelmsson ........ H04W 24/10 |

FOREIGN PATENT DOCUMENTS

| | | |
|---|---|---|
| EP | 1841148 A1 | 10/2007 |
| EP | 2933931 A2 | 10/2015 |
| GB | 2505203 A | 2/2014 |

* cited by examiner

PERFORMANCE OPTIMIZATION FOR AVIONIC WIRELESS SENSOR NETWORKS

CROSS-REFERENCE TO RELATED APPLICATION

This application claims the benefit of the IN Application No. 201711021856 filed Jun. 22, 2017, which is incorporated herein by reference in its entirety.

BACKGROUND

Exemplary embodiments pertain to the art of avionics communication and more particularly to wireless sensor communication.

Architecture of aircraft is evolving based on the application, customer needs, market segments and the availability of advanced technologies. In the process there are attempts to make aircraft more intelligent, more electrical and more data driven. Considering the cost of aircraft design life cycle and operations, it is very important to have modular and re-usable architecture still maintaining robustness and reliability of the design. Monitoring of health parameters becomes crucial for the safety-critical nature of aircraft. Communication is one of the key elements in aircraft architecture. At present, aircraft communication is predominantly wired using point-to-point wired connections and/or bus connections. There is need to move towards wireless communication to increase sensor/device placement flexibility and remove excess weight of wiring from aircraft, while also meeting data throughput and reliability constraints.

BRIEF DESCRIPTION

Disclosed is a data aggregator that includes a traffic characterization module, a rate estimator, a data regulator, and a sensor data transmission interface. The traffic characterization module is operable to generate a predicted quality of service for a plurality of sensors having one or more data rates and a plurality of priorities. The rate estimator is operable to generate a plurality of required data rates to maintain a target quality of service for one or more data consumers of an avionic communication network based on the predicted quality of service. The data regulator is operable to hold and release a plurality of sensor data from the sensors in one or more queues at the required data rates as a regulated data flow. The sensor data transmission interface is operable transmit the regulated data flow to the one or more data consumers.

In addition to one or more of the features described above, or as an alternative to any of the foregoing embodiments, further embodiments may include where at least one of the priorities of at least one of the sensors changes based on a flight phase of an aircraft.

In addition to one or more of the features described above, or as an alternative to any of the foregoing embodiments, further embodiments may include where the predicted quality of service is determined based on an average waiting time of the sensor data in the one or more queues and an average network response time for a set of the one or more data rates and the priorities of the flight phase.

In addition to one or more of the features described above, or as an alternative to any of the foregoing embodiments, further embodiments may include where a preemptive policy is applied in releasing the sensor data from the one or more queues having a higher priority before releasing the sensor data having a lower priority based on determining that one or more entries of periodic higher priority sensor data are available or one or more entries of event-based sensor data are available.

In addition to one or more of the features described above, or as an alternative to any of the foregoing embodiments, further embodiments may include where a non-preemptive policy is applied in releasing the sensor data from the one or more queues in order based on determining that the one or more entries of periodic higher priority sensor data are unavailable and the one or more entries of event-based sensor data are unavailable.

In addition to one or more of the features described above, or as an alternative to any of the foregoing embodiments, further embodiments may include where the data aggregator communicates wirelessly with one or more of the sensors.

In addition to one or more of the features described above, or as an alternative to any of the foregoing embodiments, further embodiments may include where the data aggregator communicates wirelessly with the one or more data consumers of the avionic communication network through a wireless communication access point.

Also disclosed is an avionic wireless sensor system that includes a plurality of sensors having one or more data rates and a plurality of priorities, one or more queues, and a data aggregator. The data aggregator includes a processing circuit and memory operable to establish wireless communication with the sensors and one or more data consumers in an avionic communication network, generate a predicted quality of service for the sensors, generate a plurality of required data rates to maintain a target quality of service for the one or more data consumers based on the predicted quality of service, hold and release a plurality of sensor data from the sensors in the one or more queues at the required data rates as a regulated data flow, and transmit the regulated data flow to the one or more data consumers.

A method includes generating a predicted quality of service for a plurality of sensors having one or more data rates and a plurality of priorities, and generating a plurality of required data rates to maintain a target quality of service for one or more data consumers of an avionic communication network based on the predicted quality of service. The method also includes holding and releasing a plurality of sensor data from the sensors in one or more queues at the required data rates as a regulated data flow, and transmitting the regulated data flow to the one or more data consumers.

In addition to one or more of the features described above, or as an alternative to any of the foregoing embodiments, further embodiments may include determining the predicted quality of service based on an average waiting time of the sensor data in the one or more queues and an average network response time for a set of the one or more data rates and the priorities of the flight phase.

In addition to one or more of the features described above, or as an alternative to any of the foregoing embodiments, further embodiments may include applying a preemptive policy in releasing the sensor data from the one or more queues having a higher priority before releasing the sensor data having a lower priority based on determining that one or more entries of periodic higher priority sensor data are available or one or more entries of event-based sensor data are available.

In addition to one or more of the features described above, or as an alternative to any of the foregoing embodiments, further embodiments may include applying a non-preemptive policy in releasing the sensor data from the one or more queues in order based on determining that the one or more entries of periodic higher priority sensor data are unavailable and the one or more entries of event-based sensor data are unavailable.

In addition to one or more of the features described above, or as an alternative to any of the foregoing embodiments, further embodiments may include communicating wirelessly with one or more of the sensors.

In addition to one or more of the features described above, or as an alternative to any of the foregoing embodiments, further embodiments may include communicating wirelessly with the one or more data consumers of the avionic communication network through a wireless communication access point.

In addition to one or more of the features described above, or as an alternative to any of the foregoing embodiments, further embodiments may include running a regression model to determine the required data rates with corresponding levels of priority to match the target quality of service for the one or more data consumers with the predicted quality of service.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Embodiments provide a robust and reliable wireless sensor network for avionics communication. Quality of Service (QoS) in an avionics wireless sensor network can be improved in a bandwidth/throughput limited communication environment by adjusting sensor data collection priority levels to account for sensor data rates and criticality during different phases of flight. One or more data aggregators can manage the flow of sensor data to various data consumers, such as controllers, data monitors, data loggers, and the like. The one or more data aggregators can buffer sensor data and schedule the flow of network traffic to the data consumers based on estimated required data rates of the data consumers for various sensor types. In an aircraft, examples of data consumers can include engine controls, flight control computers, and diagnostic/prognostic systems for engine health monitoring, structural health monitoring, aircraft health monitoring, integrated vehicle health monitoring, attitude and heading reference systems, and other similar aircraft systems known in the art.

Figure 1:
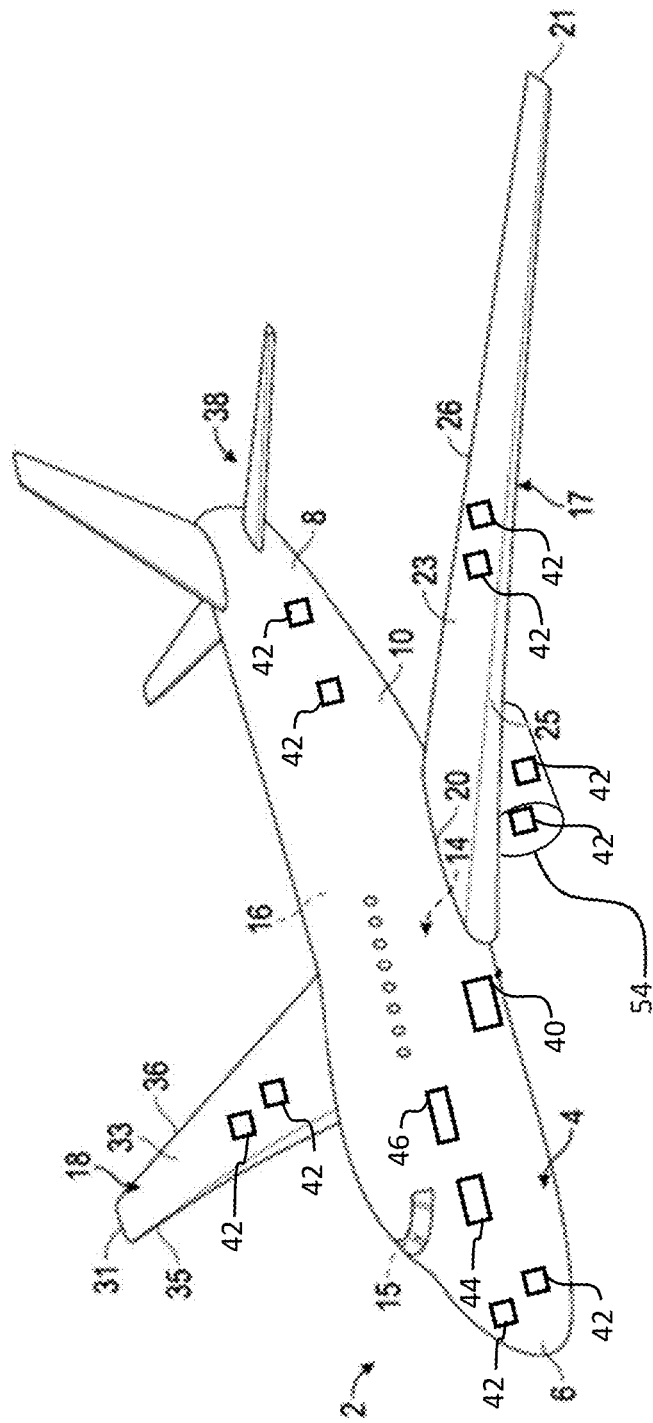
FIG. 1 is a perspective view of an aircraft that may incorporate embodiments of the present disclosure.

Referring now to the figures, FIG. 1 depicts a perspective view of an aircraft 2 that may incorporate embodiments of the present disclosure. Aircraft 2 includes a fuselage 4 extending from a nose portion 6 to a tail portion 8 through a body portion 10. Body portion 10 houses an aircraft cabin 14 that includes a crew compartment 15 and a passenger compartment 16. Body portion 10 supports a first wing 17 and a second wing 18. First wing 17 extends from a first root portion 20 to a first tip portion 21 through a first airfoil portion 23. First airfoil portion 23 includes a leading edge 25 and a trailing edge 26. Second wing 18 extends from a second root portion (not shown) to a second tip portion 31 through a second airfoil portion 33. Second airfoil portion 33 includes a leading edge 35 and a trailing edge 36. Tail portion 8 includes a stabilizer 38. Aircraft 2 includes an engine 54 configured to provide propulsion to the aircraft 2.

In embodiments, the aircraft 2 includes one or more data aggregator 40 operable to establish wireless communication with a plurality of sensors 42 and one or more data consumers 44, 46. For example, data consumer 44 can be a controller, while data consumer 46 can be a data monitor. One or more of the sensors 42 communicate wirelessly with data aggregator 40. The sensors 42 can have different characteristics in terms of data rates and priorities in the context of particular avionic applications. Some sensors 42 may only generate updated values several times per second, while other sensors 42 may generate hundreds or thousands of updated values per second. Data aggregator 40 is a computational engine operable to control the dynamically varying load traffic in the communication network formed with respect to the sensors 42 and the data consumers 44, 46 which use sensor data in order to run control loops, log the data and monitor for some diagnostic or prognostic applications. For instance, some sensor data can be event driven and other sensor data is continuously generated at a known interval. Further, some sensor data is exclusively used for monitoring but not control operations, while other sensor data may be used for both monitoring and control operations or exclusively for control operations on the aircraft 2.

Figure 2:
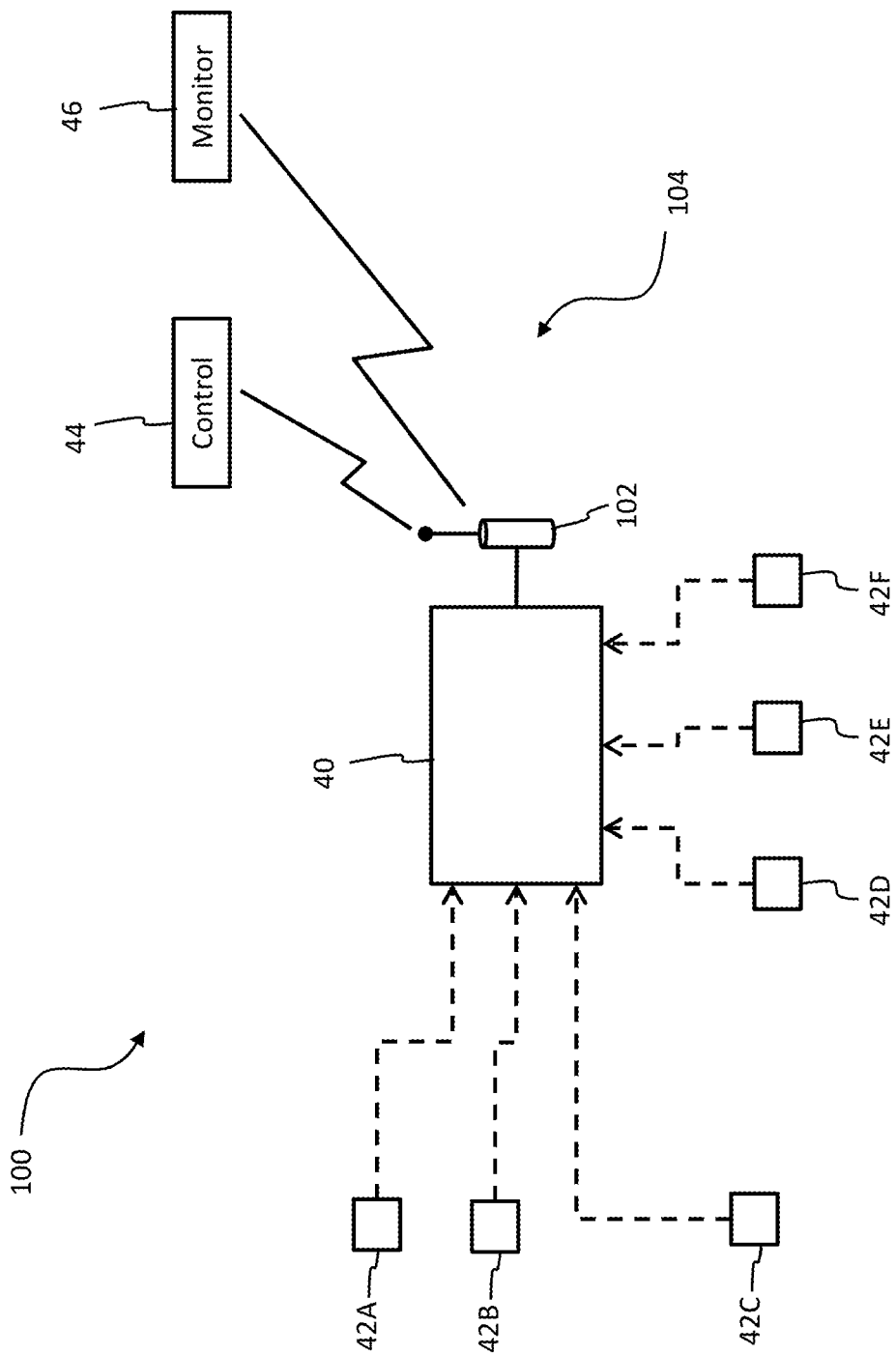
FIG. 2 is a block diagram of a system in accordance with an embodiment of the disclosure.

FIG. 2 depicts a wireless avionic sensor network 100 formed between the data aggregator 40, sensors 42A, 42B, 42C, 42D, 42E, 42F, and data consumers 44, 46. In the example of FIG. 2, the sensors 42A-F each represent groups of similar sensor types that wirelessly communicate through the data aggregator 40 to data consumers 44, 46. Examples of sensor types of sensors 42A-F include air data probe sensors, pressure sensors, speed sensors, position sensors, temperature sensors, and other sensor types known in the art. Although only six types of sensors 42A-F are depicted in FIG. 2, it will be understood that any number of sensors and sensor type variations can be supported in embodiments.

The data aggregator 40 communicates with a wireless communication access point 102 in order to transmit the sensor data across an avionic communication network 104 to the data consumers 44, 46, such as control computers, data monitors, and loggers. Different communication protocols and data rates can be supported in communications between the sensors 42A-F and the data aggregator 40 and in the avionic communication network 104. Sensor data from sensors 42A-F can be classified into multiple priorities (e.g., high and low) depending upon the applications and the data consumers 44, 46 in which sensor data is used. For example, sensor data used for flight controls typically needs to be of higher priority than data being used for diagnostics and logging purposes. The data aggregator 40 runs predictive algorithms to arrive at a traffic load which can establish a consistent QoS of the avionic communication network 104 for the data consumers 44, 46 irrespective of the diversified network segment at the sensor side.

Figure 3:
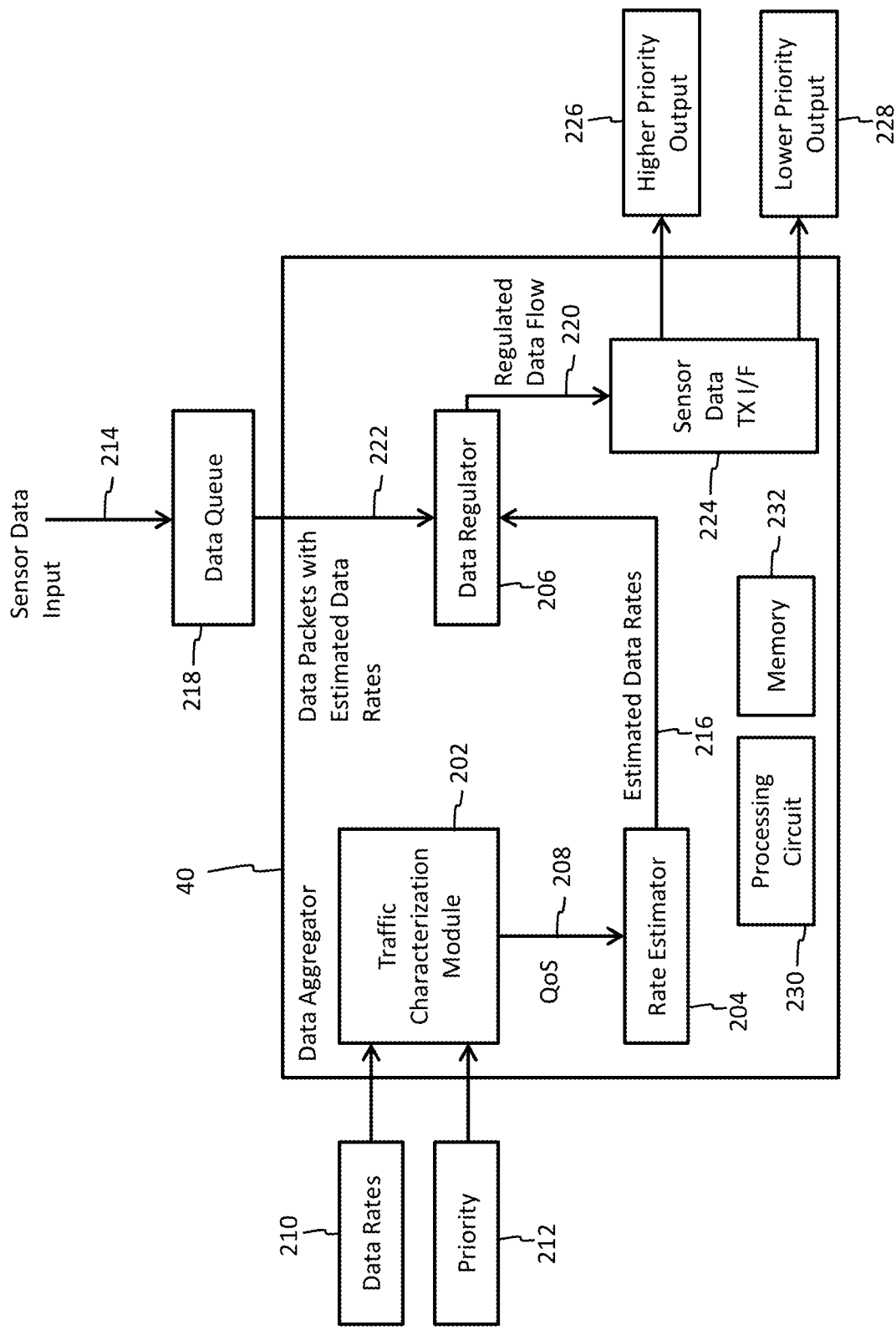
FIG. 3 is a block diagram of a data aggregator in accordance with an embodiment of the disclosure.

In embodiments, as depicted in the example of FIG. 3 and described in reference to FIGS. 1-3, the data aggregator 40 includes a traffic characterization module 202, a rate estimator 204, and a data regulator 206. The traffic characterization module 202 is operable to generate a predicted QoS 208 for a plurality of sensors 42 having one or more data rates 210 and a plurality of priorities 212. The traffic characterization module 202 takes data rates 210 and priorities 212 for the sensors 42 connected as input at sensor data input 214 and estimates the predicted QoS 208 for the data consumers 44, 46. The rate estimator 204 is operable to generate a plurality of required data rates 216 to maintain a target QoS for one or more data consumers 44, 46 of the avionic communication network 104 based on the predicted QoS 208. For example, the predicted QoS 208 may reflect the expected QoS achievable using the data rates 210 and priorities 212, while the target QoS may be defined as a QoS needed to meet service time requirements, reliability requirements, and other factors. The rate estimator 204 can be regression based to predict required data rates 216 for the for the data consumers 44, 46 and provide the required data rates 216 to the data regulator 206. A regression model can be executed by the rate estimator 204 to determine the required data rates 216 with corresponding levels of priority to match the target QoS for the one or more data consumers 44, 46 with the predicted QoS 208. For example, rate estimation can be performed using a multivariate linear regression method taking the predicted QoS 208 from traffic characterization module 202 and giving estimates for data rates output as required data rates 216.

The data regulator 206 is operable to hold and release a plurality of sensor data from the sensors 42 in one or more queues 218 at the required data rates 216 as a regulated data flow 220. The data regulator 206 regulates the dynamic network traffic based on estimated rates received with data packets 222 relative to the required data rates 216. The data regulator 206 can act as a buffer to hold and release data from the one or more queues 218 at rates specified by the rate estimator 204. Data regulation can be performed using synchronized first-in-first-out (FIFO) data structures for releasing the regulated data flow 220 at rates estimated by the rate estimator 204. Through coordinated execution, the data aggregator 40 can achieve an optimized QoS for an avionic sensor network in the scenario of different sensor characteristics, i.e., multiple data rates and different data priorities.

The data aggregator 40 can also include a sensor data transmission interface 224 operable transmit the regulated data flow 220 to the one or more data consumers 44, 46. The regulated data flow 220 can be partitioned into a higher priority output 226 and a lower priority output 228. For example, higher priority output 226 can include data for control operations, while the lower priority output 228 may be for general logging and monitoring. During operation, the priority 212 of sensors 42 can change in different flight phases resulting in a change in classification for one or more sensors between the higher priority output 226 and the lower priority output 228. Although only two output priorities are illustrated in the example of FIG. 3, it will be understood that two or more priority levels can be supported in embodiments. The sensor data transmission interface 224 can handle addressing, packet formation, and other communication system operations and may interface with the wireless communication access point 102 of FIG. 2.

In embodiments, the traffic characterization module 202, rate estimator 204, a data regulator 206, and/or sensor data transmission interface 224 can be implemented by executable instructions and/or circuitry such as a processing circuit 230 and memory 232. The processing circuit 230 can be embodied in any type of central processing unit (CPU), including a microprocessor, a digital signal processor (DSP), a microcontroller, an application specific integrated circuit (ASIC), a field programmable gate array (FPGA), or the like. Also, in embodiments, the memory 232 may include random access memory (RAM), read only memory (ROM), or other electronic, optical, magnetic, or any other computer readable medium onto which is stored data and algorithms as executable instructions in a non-transitory form.

In embodiments, the data aggregator 40 can apply one or more priority queueing algorithms to manage differences in the data rates 210 and priority 212. State transitions for the data aggregator 40 in the context of data flow can be considered as a Markovian process with the future state being defined as a function of present state and current input. The one or more queues 218 can be managed as an M/M/1 server configuration using a Poisson distribution for data arrivals belonging to each of the priority classes (e.g., high and low priority). In order to perform QoS predictions for a stochastic network model, both preemptive and non-preemptive policies can be used as further described with respect to FIG. 4.

Figure 4:
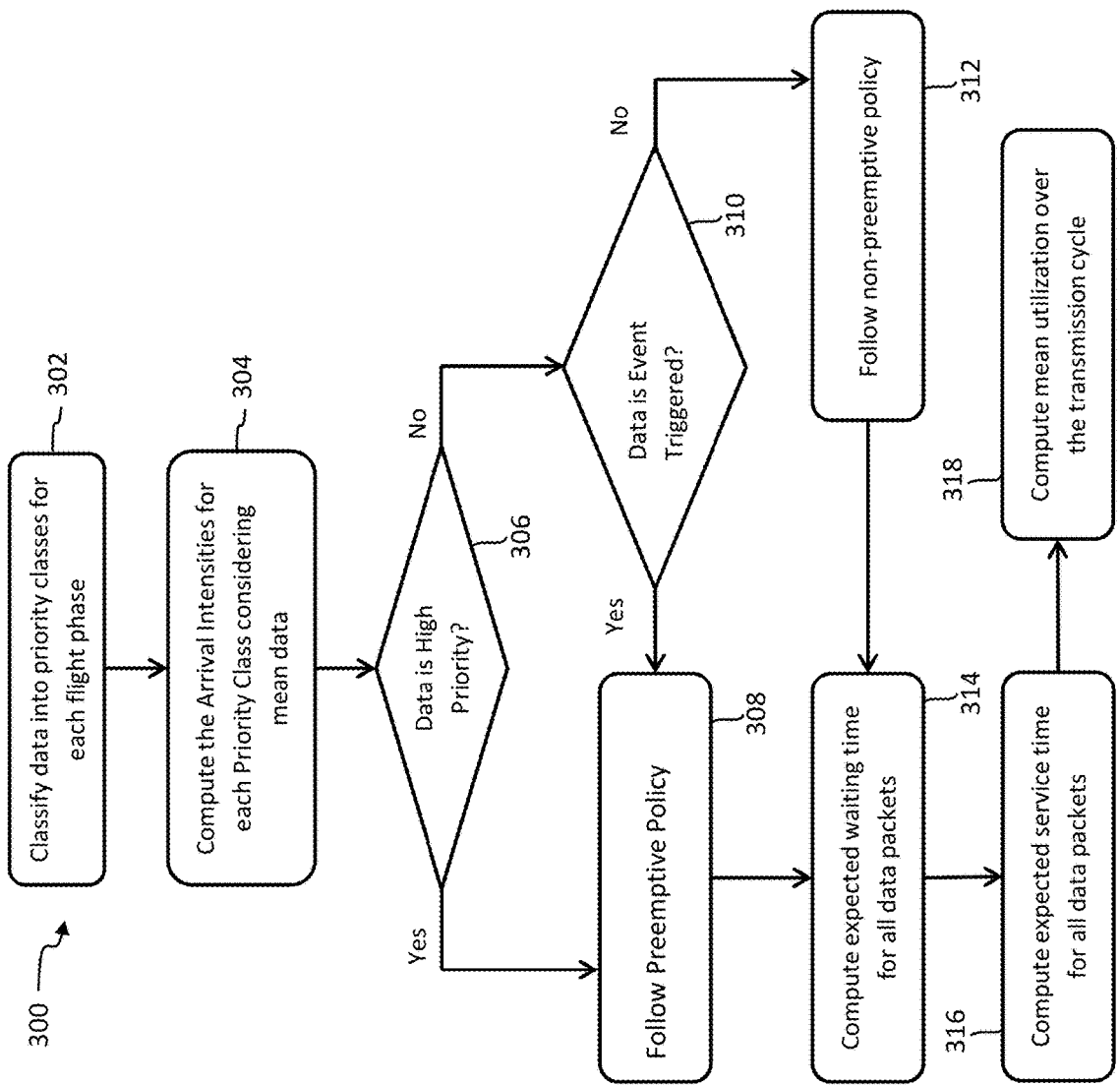
FIG. 4 is a process flow of a method in accordance with an embodiment of the disclosure.

FIG. 4 depicts a process 300 for performance optimization in avionic wireless sensor networks and is described in reference to FIGS. 1-3. At block 302, sensor data is classified into priority classes for each flight phase. An example of sensor class assignments for various sensor types is provided in table 1, where each sensor type has an associated class, frequency (sensor data rate), and mean service time (rate at which sensor data is examined/used by data consumers 44, 46).

TABLE 1

Example sensor classes

| Class | Sensor Type | Frequency | Mean Service Time |
|---|---|---|---|
| I | Airspeed | 600 Hz | 80 Hz |
| II | Attitude and Heading | 400 Hz | 80 Hz |
| III | Altitude | 100 Hz | 80 Hz |
| IV | Engine Sensors | 80 Hz | 40 Hz |
| V | Ground Speed | 80 Hz | 20 Hz |
| VI | Proximity Sensors | 10 Hz | 10 Hz |

An example of mapping sensor classes to flight phases is depicted in table 2, where sensor priority can change based on flight phase. At least one of the priorities of at least one of the sensors 42 changes based on the flight phase of the aircraft 2. For instance, class VI sensors are high priority for Parking and Taxi but low priority for Takeoff, Cruise, Approach, and Touchdown. It will be understood that tables 1 and 2 represent examples for explanation purposes, and embodiments can include many variations in sensor types, classes, durations, service times, and the like. Further, durations used for computations can be based on a preloaded flight plan, historical data, and/or other data sources. Computations can be adjusted during flight to compensate for changes in actual flight data.

TABLE 2

Flight phase examples

| Phase | Arrival Intensity (High Priority) | Arrival Intensity (Low Priority) | Mean Service Time (High Priority) (secs) | Mean Service Time (Low Priority) (secs) |
|---|---|---|---|---|
| Parking [VI, V -> High] [I, II, III, IV -> Low] | 2 | 11 | 1/20 | 1/80 |
| Taxi [VI, V -> High] [I, II, III, IV -> Low] | 8 | 63 | 1/20 | 1/80 |
| Takeoff [I, II, III, IV,V -> High] [VI -> Low] | 6 | 4 | 1/80 | 1/20 |
| Climb [I, II, III, IV,V -> High] [VI -> Low] | 31 | 4 | 1/80 | 1/20 |
| Cruise [I, II, III, IV,V -> High] [VI -> Low] | 50 | 13 | 1/80 | 1/20 |
| Approach [I, II, III, IV,V -> High] [VI -> Low] | 31 | 4 | 1/80 | 1/20 |
| Touchdown [II, IV, V -> High] [I, III, VI -> Low] | 6 | 4 | 1/80 | 1/80 |
| Taxi [VI, V -> High] [I, II, III, IV -> Low] | 8 | 63 | 1/20 | 1/80 |
| Parking [VI, V -> High] [I, II, III, IV -> Low] | 2 | 11 | 1/20 | 1/80 |

Priority classification for scheduling between preemptive and non-preemptive policies can be performed using standard heuristics on the basis of a data profile defined as periodic or event-based (which may include low-latency applications). It is known which sensor data will be used for controller and/or monitoring purposes.

At block 304, arrival intensities for each priority class is computed by traffic characterization module 202 considering mean data. Each arrival intensity of data packets at one or more queues 218 can be determined as a weighted factor of data rates 210 per sensor 42 as defined in equation 1:

$$\lambda = (T_i/\Sigma T_i) * f_{sensor} \text{ for } i=1 \ldots \text{ number of flight phases} \quad (Eq. 1)$$

Here, $\lambda$ is the arrival intensity of data packets, $T_i$ is the duration of each phase of flight, $\Sigma T_i$ is the total duration of flight, and $f_{sensor}$ is the operational frequency of the sensor.

A check of whether a data profile is periodic and belongs to a high priority class (e.g., Class 1) can be performed at block 306. As one example, a preemptive policy 308 can be applied in releasing the sensor data from the one or more queues 218 having a higher priority before releasing the sensor data having a lower priority based on determining that one or more entries of periodic higher priority sensor data are available at block 306 or one or more entries of event-based sensor data are available at block 310. Otherwise, a non-preemptive policy 312 can be applied in releasing the sensor data from the one or more queues 218 in order based on determining that the one or more entries of periodic higher priority sensor data are unavailable at block 306 and the one or more entries of event-based sensor data are unavailable at block 310.

In embodiments, if periodic data is lower priority, then the policy is preemptive such that any other low-latency or sporadic data can be attended first in preference. For event-based data, the preemptive policy 308 can be followed such that arrival of periodic data of lower priority (e.g., Class 2) can be attended in preference. Lower priority class data can be preempted with data of higher priority under preemptive policy 308. If the number of data packets in the one or more queues 218 is classified into N1 and N2 belonging to Class 1 and 2 respectively, then the average system response E[T1] and E[T2] may be defined by equations (2) and (3).

$$E[T1]=(1/\mu)/(1-\rho_1), \text{ where average service time is } 1/\mu, \text{ and } \rho_1=\lambda_1/\mu. \quad (Eq. 2)$$

$$E[T2]=E[N2]/\lambda_2 \quad (Eq. 3)$$

Where, $E[N2]=\rho_2/((1-\rho_1)(1-\rho_1-\rho_2))$

In the non-preemptive policy 312, a higher priority request does not interrupt the service of a lower priority data request. By using the law of total expectations, the mean response time for Class 1 can be obtained as defined in equations (4) to (8):

$$E[T1]=E[N1]/\mu+1/\mu+\rho_2/\mu \quad (Eq. 4)$$

$$E[N1]=\lambda_1 E[T1] \quad (Eq. 5)$$

$$E[N1]=((1+\rho_2)\rho_1)/(1-\rho_1) \quad (Eq. 6)$$

$$E[N2]=((1-\rho_1(1-\rho_1-\rho_2))\rho_2)/(\mu(1-\rho_1)(1-\rho_1-\rho_2)) \quad (Eq. 7)$$

$$E[T2]=E[N2]/\lambda_2=((1-\rho1(1-\rho_1-\rho_2))\rho_2)/(\mu(1-\rho_1)(1-\rho_1-\rho_2)) \quad (Eq. 8)$$

Context dependent switching between preemptive and non-preemptive policies 308, 312 can be performed for concurrent access to any data request. The ability to switch policies can lead to improved throughput and hence better bandwidth utilization. At block 314, an expected waiting time is computed for data packets (e.g., E[T1] and E[T2]), and corresponding service times (e.g., 1/μ) are computed at block 316 using priority queuing for respective policies over each flight phase. At block 318, mean server utilization can be computed for each phase using average systems response and waiting time of blocks 314 and 316. The predicted QoS 208 can be determined based on an average waiting time of the sensor data in the one or more queues 218 and an average network response time for a set of the one or more data rates 210 and the priorities 212 of the flight phase, as previously described with respect to table 2.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A data aggregator comprising:
a traffic characterization module operable to generate a predicted quality of service for a plurality of sensors having one or more data rates and a plurality of priorities, wherein at least one of the priorities of at least one of the sensors changes based on a flight phase of an aircraft according to a predetermined mapping of sensor classes to a plurality of flight phases;
a rate estimator operable to generate a plurality of required data rates to maintain a target quality of service for one or more data consumers of an avionic communication network based on the predicted quality of service;
a data regulator operable to hold and release a plurality of sensor data from the sensors in one or more queues at the required data rates as a regulated data flow, wherein the predicted quality of service is determined based on an average waiting time of the sensor data in the one or more queues and an average network response time for a set of the one or more data rates and the priorities of the flight phase; and
a sensor data transmission interface operable transmit the regulated data flow to the one or more data consumers.

2. The data aggregator of claim 1, wherein a preemptive policy is applied in releasing the sensor data from the one or more queues having a higher priority before releasing the sensor data having a lower priority based on determining that one or more entries of periodic higher priority sensor data are available or one or more entries of event-based sensor data are available.

3. The data aggregator of claim 2, wherein a non-preemptive policy is applied in releasing the sensor data from the one or more queues in order based on determining that the one or more entries of periodic higher priority sensor data are unavailable and the one or more entries of event-based sensor data are unavailable.

4. The data aggregator of claim 1, wherein the data aggregator communicates wirelessly with one or more of the sensors.

5. The data aggregator of claim 1, wherein the data aggregator communicates wirelessly with the one or more data consumers of the avionic communication network through a wireless communication access point.

6. An avionic wireless sensor system comprising:
a plurality of sensors having one or more data rates and a plurality of priorities, wherein at least one of the priorities of at least one of the sensors changes based on a flight phase of an aircraft according to a predetermined mapping of sensor classes to a plurality of flight phases;
one or more queues; and
a data aggregator comprising a processing circuit and memory operable to establish wireless communication with the sensors and one or more data consumers in an avionic communication network, generate a predicted quality of service for the sensors, generate a plurality of required data rates to maintain a target quality of service for the one or more data consumers based on the predicted quality of service, hold and release a plurality of sensor data from the sensors in the one or more queues at the required data rates as a regulated data flow, and transmit the regulated data flow to the one or more data consumers, wherein the predicted quality of service is determined based on an average waiting time of the sensor data in the one or more queues and an average network response time for a set of the one or more data rates and the priorities of the flight phase.

7. The avionic wireless sensor system of claim 6, wherein a preemptive policy is applied in releasing the sensor data from the one or more queues having a higher priority before releasing the sensor data having a lower priority based on determining that one or more entries of periodic higher priority sensor data are available or one or more entries of event-based sensor data are available.

8. The avionic wireless sensor system of claim 7, wherein a non-preemptive policy is applied in releasing the sensor data from the one or more queues in order based on determining that the one or more entries of periodic higher priority sensor data are unavailable and the one or more entries of event-based sensor data are unavailable.

9. A method comprising:
generating a predicted quality of service for a plurality of sensors having one or more data rates and a plurality of priorities, wherein at least one of the priorities of at least one of the sensors changes based on a flight phase of an aircraft according to a predetermined mapping of sensor classes to a plurality of flight phases;
generating a plurality of required data rates to maintain a target quality of service for one or more data consumers of an avionic communication network based on the predicted quality of service;
holding and releasing a plurality of sensor data from the sensors in one or more queues at the required data rates as a regulated data flow, wherein the predicted quality of service is determined based on an average waiting time of the sensor data in the one or more queues and an average network response time for a set of the one or more data rates and the priorities of the flight phase; and
transmitting the regulated data flow to the one or more data consumers.

10. The method of claim 9, further comprising applying a preemptive policy in releasing the sensor data from the one or more queues having a higher priority before releasing the sensor data having a lower priority based on determining that one or more entries of periodic higher priority sensor data are available or one or more entries of event-based sensor data are available.

11. The method of claim 10, further comprising applying a non-preemptive policy in releasing the sensor data from the one or more queues in order based on determining that the one or more entries of periodic higher priority sensor data are unavailable and the one or more entries of event-based sensor data are unavailable.

12. The method of claim 9, further comprising communicating wirelessly with one or more of the sensors.

13. The method of claim 9, further comprising communicating wirelessly with the one or more data consumers of the avionic communication network through a wireless communication access point.

14. The method of claim 9, further comprising running a regression model to determine the required data rates with corresponding levels of priority to match the target quality of service for the one or more data consumers with the predicted quality of service.

* * * * *